US009140078B2

(12) United States Patent
Angelle et al.

(10) Patent No.: US 9,140,078 B2
(45) Date of Patent: Sep. 22, 2015

(54) EXTENDED RANGE SINGLE-JOINT ELEVATOR

(71) Applicant: Frank's International, LLC, Houston, TX (US)

(72) Inventors: Jeremy Richard Angelle, Lafayette, LA (US); John Erick Stelly, Breaux Bridge, LA (US); Tyler J. Hollier, Broussard, LA (US); Logan Essex Smith, Youngsville, LA (US)

(73) Assignee: Frank's International, LLC, Houston, TX (US)

( * ) Notice: Subject to any disclaimer, the term of this patent is extended or adjusted under 35 U.S.C. 154(b) by 0 days.

(21) Appl. No.: 14/452,432

(22) Filed: Aug. 5, 2014

(65) Prior Publication Data

US 2014/0345879 A1 Nov. 27, 2014

Related U.S. Application Data

(63) Continuation-in-part of application No. 13/459,340, filed on Apr. 30, 2012, now Pat. No. 8,794,684.

(60) Provisional application No. 61/481,218, filed on May 1, 2011.

(51) Int. Cl.
  *B66C 1/48* (2006.01)
  *E21B 19/07* (2006.01)
  *B23P 19/04* (2006.01)

(52) U.S. Cl.
  CPC ............ *E21B 19/07* (2013.01); *B23P 19/04* (2013.01); *Y10T 29/49904* (2015.01)

(58) Field of Classification Search
  USPC ............ 294/102.2, 102.1, 86.19, 86.2, 86.26, 294/86.28, 86.3, 90, 116; 188/67; 166/75.14, 77.1, 382, 77.52; 175/423
  See application file for complete search history.

(56) References Cited

U.S. PATENT DOCUMENTS

| 1,433,624 | A |   | 10/1922 | Johnston |
| 1,721,024 | A | * | 7/1929  | Krell et al. ................. 294/102.2 |
| 4,275,488 | A |   | 6/1981  | Gray et al. |

(Continued)

FOREIGN PATENT DOCUMENTS

WO  WO 2007/126319  * 11/2007 ............. E21B 19/10

OTHER PUBLICATIONS

International Search Report and Written Opinion from PCT/US2012/035752 dated 11/12012 (8 pages).

(Continued)

*Primary Examiner* — Paul T Chin
(74) *Attorney, Agent, or Firm* — Osha Liang LLP

(57) ABSTRACT

An elevator to manipulate a tubular segment includes an elevator body with a bore formed therethrough having an axis therein, the elevator body including a plurality of openings extending from an outer surface of the elevator body to the bore of the elevator body, and a base member coupled to a bottom surface of the elevator body, the base member having a guide portion that directs the tubular segment into the bore of the elevator body. The elevator also includes a plurality of slip assemblies disposed inside the plurality of openings and coupled to the elevator body, each of the plurality of slip assemblies including an actuator body coupled to the elevator body, a slip, the slip including an engagement surface disposed orthogonal to the axis of the bore of the elevator body that engages the tubular segment.

20 Claims, 11 Drawing Sheets

(56) References Cited

U.S. PATENT DOCUMENTS

| | | | |
|---|---|---|---|
| 4,354,706 A * | 10/1982 | Coyle, Sr. ............... | 294/102.2 |
| 5,992,801 A * | 11/1999 | Torres ................... | 188/67 |
| 6,073,699 A | 6/2000 | Hollingsworth, Jr. | |
| 6,494,273 B1 | 12/2002 | Martin | |
| 6,571,667 B2 | 6/2003 | Price et al. | |
| 7,681,649 B2 | 3/2010 | Cerovsek | |
| 7,762,343 B2 | 7/2010 | Sonneveld et al. | |
| 7,980,298 B2 * | 7/2011 | Halse ..................... | 166/77.1 |
| 7,992,634 B2 * | 8/2011 | Angelle et al. ......... | 294/102.2 |
| 8,322,687 B2 * | 12/2012 | Faccio et al. .......... | 188/67 |
| 8,794,684 B2 * | 8/2014 | Angelle et al. ......... | 294/102.2 |
| 2009/0057032 A1 * | 3/2009 | Angelle et al. ......... | 166/77.52 |
| 2010/0200221 A1 * | 8/2010 | Sipos ..................... | 166/380 |
| 2012/0325496 A1 * | 12/2012 | Angelle et al. ......... | 166/380 |

OTHER PUBLICATIONS

International Preliminary Report on Patentability issued in PCT/US2012/035752 mailed Nov. 14, 2013 (5 pages).

* cited by examiner

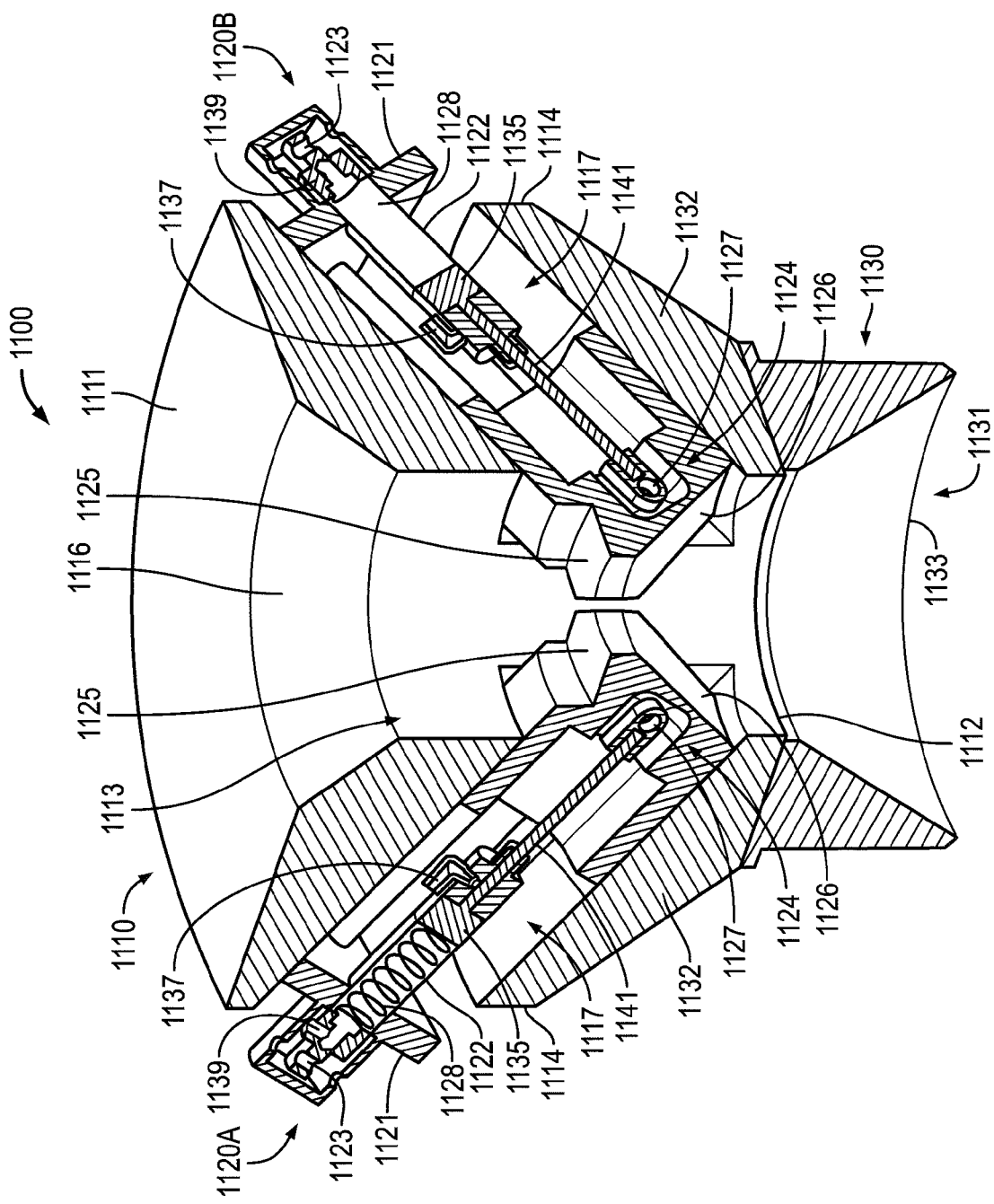

EXTENDED RANGE SINGLE-JOINT ELEVATOR

CROSS-REFERENCE TO RELATED APPLICATIONS

The present application is a continuation-in-part of U.S. patent application Ser. No. 13/459,340, filed Apr. 30, 2012, issued on Aug. 5, 2014 as U.S. Pat. No. 8,794,684 (the "'340 application"). The '340 application claims priority to U.S. Provisional Application Ser. No. 61/481,218, filed May 1, 2011 (the "'218 application"). The '340 application and the '218 application are both incorporated herein by reference in their entirety.

BACKGROUND

In the oil and gas industry, wellbores are drilled into the Earth using drilling rigs, where tubulars are threaded together to form long tubular strings that are inserted into the wellbore to extract the desired fluid. The tubular string is generally suspended in the borehole using a rig floor-mounted spider, such that each new tubular segment or stand may be threaded onto the end of the previous tubular just above the spider. A single-joint elevator is commonly used to grip and secure the segment or stand to a hoist to lift the segment or stand into position for threading the tubular together.

For installing a string of casing, single-joint elevators generally include a pair of hinged body halves that open to receive a tubular segment and subsequently close to secure the tubular segment within the elevator. Single-joint elevators are specifically adapted for securing and lifting tubular segments having a conventional connection, such as an internally-threaded sleeve that receives and secures an externally-threaded end from each of two tubular segments to secure the segments in a generally abutting relationship. The internally-threaded sleeve is first threaded onto the end of a first tubular segment to form a "box end." The externally-threaded "pin end" of a second tubular segment is then threaded into the box end to complete the connection between the two segments. When the elevator is in the closed position, i.e., when the hinged body halves are secured shut, the internal diameter of the elevator is less than the outer diameter of the box end. Consequently, the circumferential shoulder formed by the elevator engages the tubular segment at a corresponding shoulder formed by the end of the sleeve, thereby preventing the tubular segment from slipping through the elevator.

At least one challenge encountered by typical single joint elevators is that they are designed to catch a very small range (e.g., outside diameter) of casing. With numerous integral and upset connections currently being used in the field, there are often times variances in the outside diameter of the box end of the casing that prohibit the use of a solitary singlejoint elevator. Instead, two or more single-joint elevators are required to accommodate the varying outside diameters of the pipes and/or connections encountered.

What is needed, therefore, is a multi-range, single-joint elevator capable of being secured to tubulars having a range of deviations in the outside diameter thereof.

SUMMARY

Embodiments of the disclosure may provide an oilfield elevator. The elevator may include first and second body halves pivotally-coupled at a hinge and moveable between an open position and a closed position, and one or more slips slidably received within one or more corresponding downwardly-tapered slots defined in respective inner circumferential surfaces of the first and second body halves, the one or more slips being configured to translate vertically within the one or more tapered slots and, at the same time, translate radially with respect to the first and second body halves. The elevator may also include first and second timing bars coupled to the one or more slips, and first and second tension handles pivotally-coupled to the first and second body halves, respectively, and moveable between a locked position and an unlocked position, the first and second tension handles each having a body that terminates at a connection point. The elevator may further include first and second biasing members each having a first end coupled to the connection point of the first and second tension handles, respectively, and a second end coupled to the first and second timing bars, respectively, wherein the first and second biasing members impart a downward force on the one or more slips via the first and second timing bars when the first and second handles are in the locked position, and wherein the first and second biasing members reduce the downward force on the one or more slips via the first and second timing bars when the first and second handles are in the unlocked position.

Embodiments of the disclosure may further provide a method for engaging a tubular segment. The method may include positioning an elevator adjacent the tubular segment, the elevator including first and second body halves having slips slidably received within corresponding tapered slots defined in the first and second body halves, wherein a first timing bar is coupled to the slips in the first body half and a second timing bar is coupled to the slips in the second body half, and closing the first and second body halves around the tubular segment. The method may further include moving first and second tension handles from an unlocked position to a locked position, the first and second tension handles being pivotally coupled to the first and second body halves, respectively, and each tension handle having a body that terminates at a connection point, and applying a downward force on the first and second timing bars with first and second biasing members having a first end coupled to the connection point of the first and second tension handles, respectively, and a second end coupled to the first and second timing bars, respectively. The method may also include transmitting the downward force from the first and second timing bars to the slips, the slips being configured to translate vertically within the tapered slots and, at the same time, translate radially with respect to the first and second body halves in response to the downward force, wherein the slips translate vertically and radially until coming into contact with an outside surface of the tubular segment.

Embodiments of the disclosure may further provide an apparatus for engaging a tubular segment. The apparatus may include first and second body halves pivotally-coupled at a hinge and moveable between an open position and a closed position, one or more slips slidably received within downwardly and inwardly-tapered slots defined in the first and second body halves, the one or more slips being configured to translate within the tapered slots, and first and second timing bars coupled to the one or more slips. The apparatus may also include first and second tension handles pivotally-coupled to the first and second body halves, respectively, and moveable between a locked position and an unlocked position, each tension handle having a body that is coupled to a connection point, and first and second biasing members, each having a first end coupled to the connection point of the first and second tension handles, respectively, and a second end coupled to the first and second timing bars, respectively, the first and second biasing members being configured to impart a downward force on the first and second timing bars when the first and second handles are in the locked position, thereby forcing the one or more slips to translate within the tapered slots until coming into contact with the outside surface of the tubular segment.

Embodiments of this disclosure may further provide an elevator to manipulate a tubular segment, the elevator including an elevator body with a bore formed therethrough having an axis therein, the elevator body including a plurality of openings extending from an outer surface of the elevator body to the bore of the elevator body, and a base member coupled to a bottom surface of the elevator body, the base member having a guide portion that directs the tubular segment into the bore of the elevator body. The elevator also includes a plurality of slip assemblies disposed inside the plurality of openings and coupled to the elevator body, each of the plurality of slip assemblies including an actuator body coupled to the elevator body, a slip, the slip including an engagement surface disposed orthogonal to the axis of the bore of the elevator body that engages the tubular segment, and a guide surface adjacent to a bottom surface of the elevator body that is angled such that the tubular segment slides through the bore of the elevator body until the tubular segment is engaged by the engagement surface, and a powered actuator coupled to the slip and the actuator body, in which the powered actuator is configured to retract the slip from the center of the bore of the elevator body.

Embodiments of this disclosure may further provide a method to manufacture an elevator that engages a tubular segment, the method including forming a bore in an elevator body of the elevator, and forming a plurality of openings in the elevator housing that extend from an outer surface of the elevator body to the bore of the elevator body, assembling a plurality of slip assemblies. Assembling each of the plurality of slip assemblies includes coupling a powered actuator to an actuator body, and coupling the powered actuator to the slip, in which the powered actuator is configured to retract the slip from the biased position and toward the actuator body. The method to manufacture also includes disposing the plurality of slip assemblies inside the plurality of openings of the elevator body, and coupling the plurality of slip assemblies to the elevator body, wherein the plurality of slip assemblies are configured to automatically engage the tubular segment.

Embodiments of this disclosure may further provide a method to add a tubular segment to a drilling string of pipe, the method including rotating the tubular segment up from a non-vertical position to a substantially vertical position and grasping the tubular segment in the vertical position with an elevator. Grasping the tubular segment includes lowering the elevator over an upper end of the tubular segment, separating a plurality of slips from a closed position to an open position by the upper end of the tubular segment, wherein the plurality of slips are biased toward the closed position, and automatically enclosing the plurality of slips about an outer diameter of the tubular segment, wherein a shoulder on the upper end of the tubular segment rests on upper surfaces of the plurality of slips. The method to add a tubular segment also includes lifting the tubular segment with the elevator, positioning the tubular segment over the drilling string of pipe, threading the tubular segment onto the drilling string of pipe by rotating the tubular segment using the elevator, and releasing the tubular segment from the elevator by retracting the slips from the outer diameter of the tubular segment.

BRIEF DESCRIPTION OF DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIGS. 11A and 11B illustrate cross-sectional views of an elevator, according to one or more embodiments of the disclosure.

DETAILED DESCRIPTION

Figure 1:
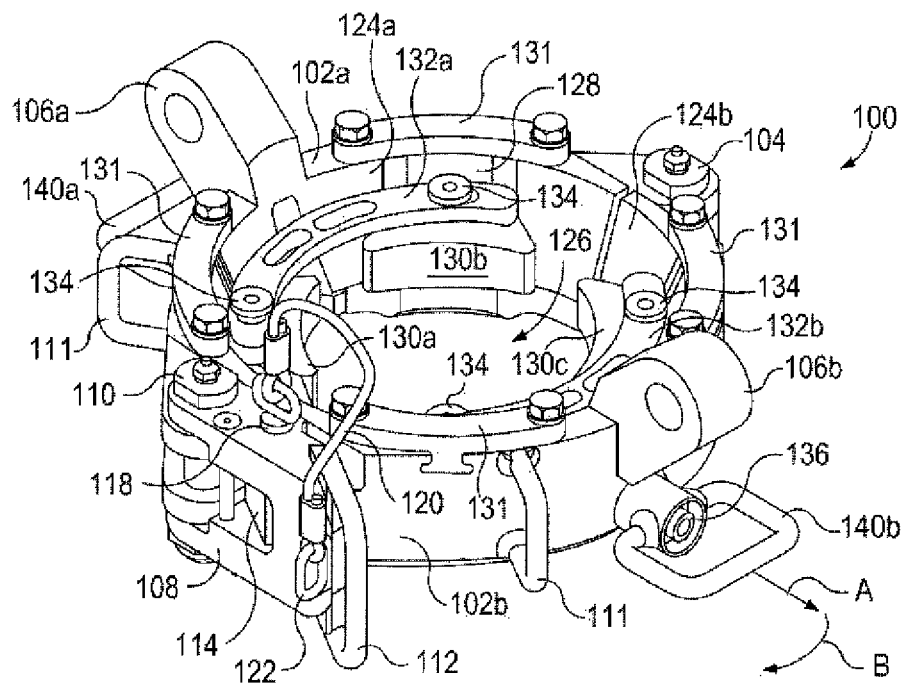
FIG. 1 illustrates an isometric view of an exemplary elevator, according to one or more embodiments of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
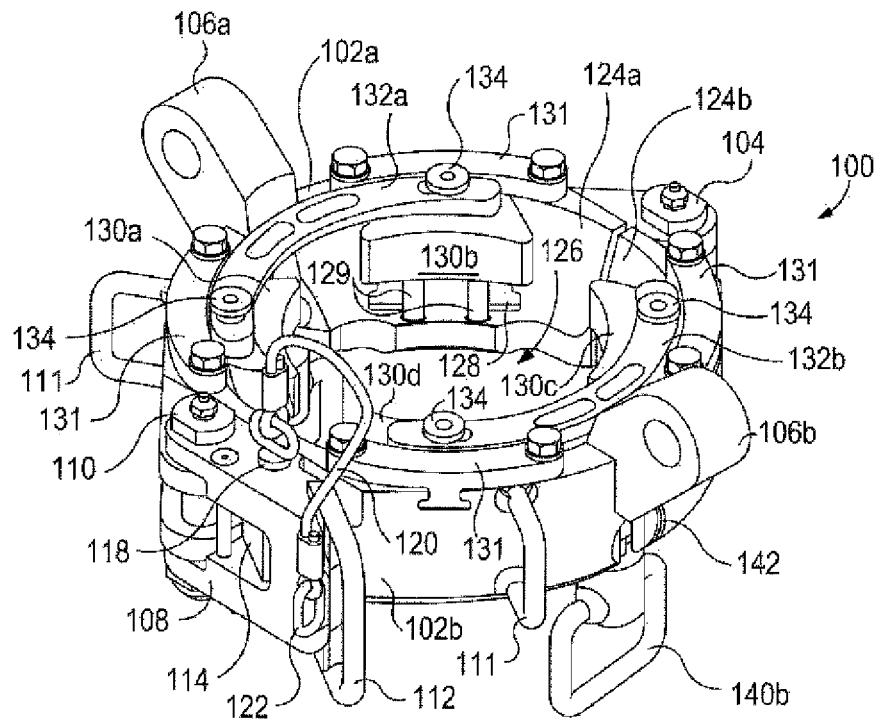
FIG. 2 illustrates an isometric view of the elevator of FIG. 1 with tension handles in the unlocked position, according to one or more embodiments of the disclosure.
Figure 3:
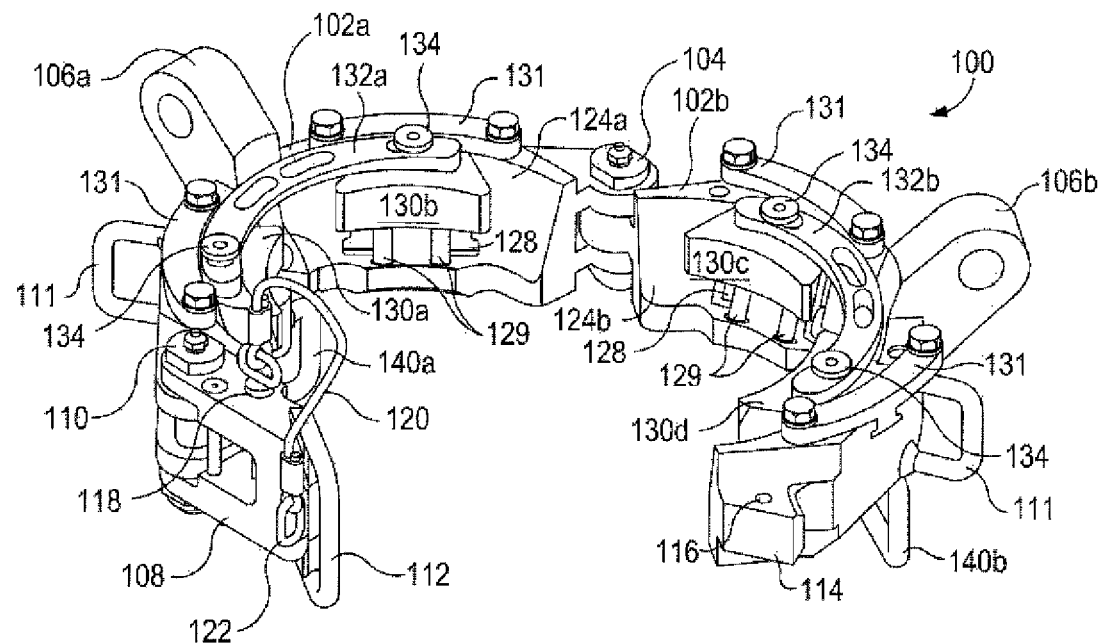
FIG. 3 illustrates an isometric view of the elevator of FIG. 1 in an open position, according to one or more embodiments of the disclosure.

FIGS. 1-3 illustrate an exemplary oilfield elevator 100, according to one or more embodiments disclosed. The elevator 100 is moveable between a closed position, as shown in FIGS. 1 and 2, and an open position, as shown in FIG. 3. In one embodiment, the elevator 100 may be a single-joint elevator configured to grasp onto and position a singular tubular segment, such as a drill pipe or casing, for coupling to a tubular string. The elevator 100 may include a first body half 102a and a second body half 102b pivotally connected at a hinge 104. Each body half 102a,b may have a lifting ear 106a and 106b, respectively, integrally formed therewith or connected thereto and configured to be coupled to or otherwise receive links (not shown) in order to position the elevator 100 during tubular makeup operations.

The elevator 100 is moveable between the open and closed positions by pivoting each body half 102a,b about the axis of the hinge 104. To help accommodate this movement, one or more positioning handles 111 may be attached to the exterior of the first and second halves 102a,b to be grasped by a user to manipulate their general position. In other embodiments, the positioning handles 111 may be omitted and an automated opening/closing system (not shown) may be implemented to mechanically open/close the elevator 100. For example, the elevator 100 may be opened/closed using mechanical devices such as hydraulics, servos, gearing, etc., without departing from the scope of the disclosure.

The elevator 100 may be secured in the closed position with a locking apparatus 108 pivotally-coupled to the first body half 102a with a pivotal coupling 110. In other embodiments, the locking apparatus 108 may be pivotally coupled to the second body half 102b, without departing from the scope of the disclosure. In one embodiment, the pivotal coupling 110 may be spring loaded. A locking handle 112 projects from the locking apparatus 108 and may be grasped by a user to manually bring the first body half 102a into proximity of the second body half 102b. Once the first and second body halves 102a1b are proximally aligned, the locking mechanism 108 may be configured to extend over a latch 114 (best seen in FIG. 3) integrally-formed with the second body half 102b. The latch 114 may define a perforation 116 (FIG. 3) adapted to receive a pin 118 (partially shown). The pin 118 may be extendable through corresponding perforations (not shown) defined in the locking mechanism 108 and into the perforation 116 to secure the locking mechanism 108 in the closed position. As illustrated, the pin 118 may be attached to a cord or cable 120 that is anchored to the locking mechanism 108 at an anchor point 122.

The first and second body halves 102a and 102b each define an inner circumferential surface 124a and 124b, respectively. When the elevator 100 is in the closed position, the inner circumferential surfaces 124a,b cooperatively define a generally circular opening or throat 126 that may be configured to receive and secure a tubular or casing segment. The inner circumferential surfaces 124a,b may further define a series of tapered slots 128; one slot is 128 shown in FIGS. 1 and 2, and two slots 128 are shown in FIG. 3. The term "tapered" as used herein refers to the slots 128 being inclined to the axis of the throat 126, such as being downwardly and inwardly-tapered with respect to the axis of the throat 126.

The tapered slots 128 may be equidistantly-spaced from each other about the inner circumferential surfaces 124a,b. In one embodiment, each inner circumferential surface 124a,b may define a total of two slots 128, but in other embodiments more or less than two slots 128 may be provided. Moreover, the number of slots 128 defined in either inner circumferential surface 124a,b does not necessarily have to be equal, but may vary depending on the application.

Each slot 128 may be adapted to slidably receive a slip 130, such as slips 130a, 130b, 130c, and 130d (only slips 130a,b,c are shown in FIG. 1). As illustrated, the slots 128 defined in the first inner circumferential surface 124a may slidably receive the first slip 130a and the second slip 130b, while the slots 128 defined in the second inner circumferential surface 124b may slidably receive the third slip 130c and the fourth slip 130d. Each slip 130a-d may be partially cylindrical and configured to engage the outside surface of a tubular segment, as will be described in more detail below.

During elevator 100 operation, the slips 130a-d may be able to translate vertically within their respective slots 128. To facilitate this vertical translation, each slot 128 may include one or more rails 129 (FIGS. 2 and 3) configured to seat a respective slip 130a-d. The rails 129 may be configured to extend through a portion of the respective slip 130a-d, thereby providing a fixed translation path for each slip 130a-d. In at least one embodiment, each rail 129 may be encompassed by a compression spring 152 (FIG. 4) adapted to continuously bias the respective slip 130a-d upward and into an "open" position. In other embodiments, the compression springs 152 may be separate from the rails 129 but nonetheless work in concert therewith to facilitate the vertical translation of the slips 130a-d.

Each slip 130a-d may be maintained within its respective slot 128 using a retainer plate 131 fastened to the first or second body halves 102a,b adjacent the upper end of each slot 128. The retainer plates 131 may be fastened to the first or second body halves 102a,b by any known method including, but not limited to, mechanical fasteners.

A first timing bar 132a may be used to moveably couple the first slip 130a to the second slip 130b, such that when the first slip 130a moves, the second slip 130b moves as well, and vice versa. A second timing bar 132b may be used to moveably couple the third slip 130c to the fourth slip 130d such that when the third slip 130c moves, the fourth slip 130d moves as well, and vice versa. One or more mechanical fasteners 134 (e.g., bolts, screws, etc.) may be used to secure the timing bars 132a,b to the respective slips 130a-d. In other embodiments, however, the timing bars 132a,b may be attached to the respective slips 130a-d via other attachments, such as welding, brazing, adhesives, or combinations thereof, without departing from the scope of the disclosure.

The elevator 100 may further include first and second tension handles 140a and 140b pivotally coupled to the first and second body halves 102a and 102b, respectively. FIG. 1 shows the tension handles 140a,b in a "locked" position, and FIGS. 2 and 3 show the tension handles 140a,b in an "unlocked" position. In the locked position, each tension handle 140a,b may rest or otherwise be seated within a recessed pocket defined in the outer circumferential surface of each body half 102a,b, respectively. Moreover, each tension handle 140a,b may include a spring-loaded body fixture 136 (FIG. 1) adapted to bias the tension handle 140a,b into its respective recessed pocket.

To unlock the tension handles 140a,b, a user may pull radially-outward on the tension handle 140b (or 140a), as indicated by arrow A in FIG. 1, to remove it from the recessed pocket. Once removed from the recessed pocket, the tension handle 140b may swivel downward and back toward the body half 140b, as indicated by arrow B. Locking the tension handles 140a,b back in place within the recessed pockets can be accomplished by a reversal of the above-described steps.

Figure 4:
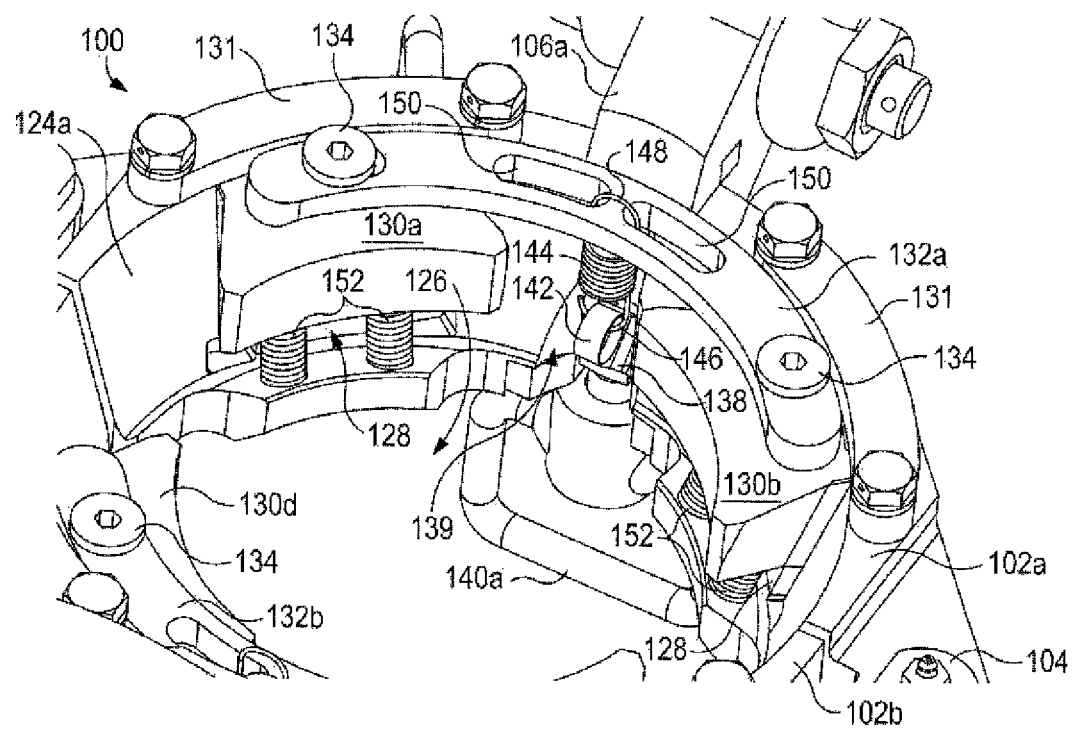
FIG. 4 illustrates a close-up view of a throat of the elevator of FIG. 1, with the tension handle in the unlocked position, according to one or more embodiments of the disclosure.
Figure 5:
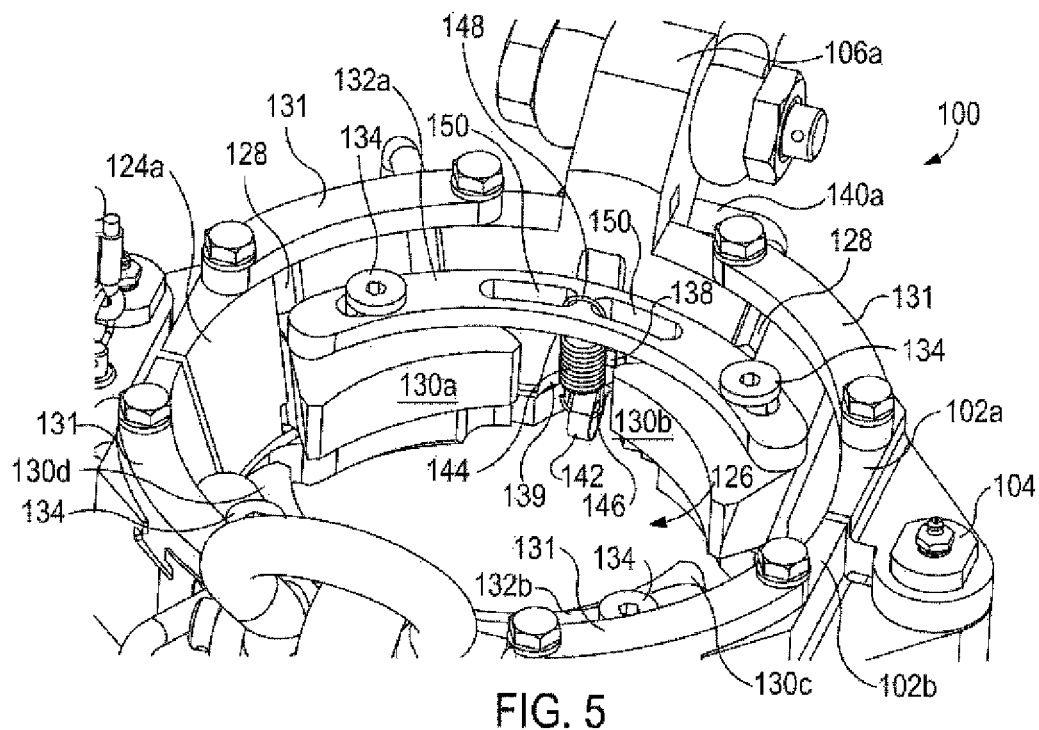
FIG. 5 illustrates a close-up view of the throat of the elevator of FIG. 1, with the tension handle in the locked position, according to one or more embodiments of the disclosure.

Referring now to FIGS. 4 and 5, with continuing reference to FIGS. 1-3, illustrated are isometric views of the elevator 100 with the tension handles 140a,b in the unlocked (FIG. 4) and locked (FIG. 5) positions, according to one or more embodiments of the disclosure. Although only the first body half 102a, including the first tension handle 140a, is shown in FIGS. 4 and 5 and described below, it will be appreciated that the following description is equally applicable to the components of the second body half 102b, especially including the second tension handle 140b, but will not be discussed herein for the sake of brevity.

As illustrated, the first tension handle 140a may include a body 138 that extends generally into the throat 126 through an opening 139 defined in the first body half 102a. The opening 139 may generally extend from the outer surface of the first body half 102a to the inner circumferential surface 124a. The body 138 may terminate at a connection point 142 configured to be coupled to a biasing member 144, for example, at a first end 146 of the biasing member 144. In one embodiment, the biasing member 144 may be a tension spring, as illustrated. In other embodiments, however, the biasing member 144 may be any other device capable of providing a biasing force such as, but not limited to, pneumatic devices, hydraulic devices, servo devices, electromagnets, or combinations thereof.

In the illustrated embodiment, the connection point 142 includes a ring structure, but in other embodiments the connection point 142 may include any other type of structure capable of being coupled to the biasing member 144. The biasing member 144 may also include a second end 148 configured to be coupled to the first timing bar 132a. In one embodiment, the first timing bar 132a may define one or more holes 150 for receiving or otherwise securing the second end 148 of the biasing member 144. It will be appreciated, however, that the second end 148 may be secured to the first timing bar 132a in any known manner, without departing from the scope of the disclosure.

When the first tension handle 140a is in the unlocked position (FIG. 4), the biasing member 144 is able to retract, at least partially, and thereby reduce the downward force exhibited on the first timing bar 132a. As the downward force on the timing bar 132a is removed or otherwise diminished, the compression springs 152 are able to expand and force the first and second slips 130a,b vertically-upward and into the open position within their respective slots 128. Since the slots 128 are inclined to the axis of the throat 126, upward axial movement of the slips 130a,b simultaneously results in a radial movement of the slips 130a,b away from the center of the throat 126. Consequently, in the open position the slips 130a,b provide the largest throat 126 area.

When the first tension handle 140a is returned to its locked position (FIG. 5), the connection point 142 pulls down on and engages the biasing member 144 which transmits a generally downward force on the first timing bar 132a. As a result, the first timing bar 132a conveys a generally downward force on the first and second slips 130a,b and their accompanying compression springs 152, thereby causing the axial downward movement of the slips 130a,b. Moreover, because of the tapered disposition of the slots 128, downward axial movement of the slips 130a,b simultaneously results in a radial movement of the slips 130a, b toward the center of the throat 126. Consequently, in the closed position the slips 130a,b present the smallest throat 126 area for the elevator 100.

Figure 6:
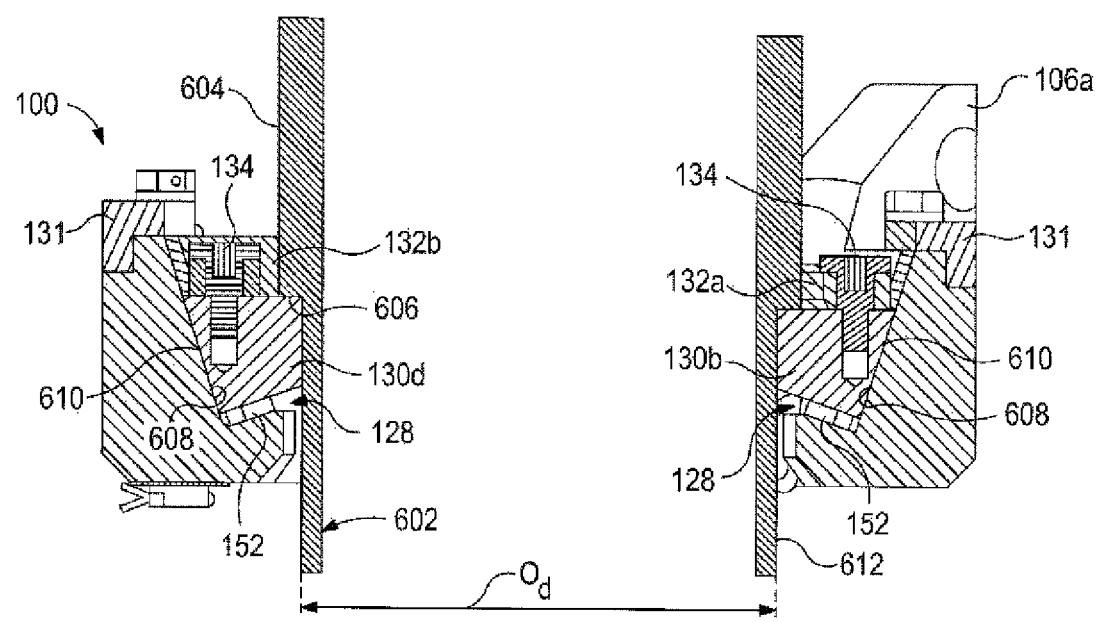
FIG. 6 illustrates a cross-sectional view of an exemplary elevator grasping a tubular segment, according to one or more embodiments of the disclosure.

Referring to FIG. 6, illustrated is a cross-sectional view of the exemplary elevator 100 as it engages a casing or tubular segment 602, according to one or more embodiments. In one embodiment, the tubular segment 602 may include a sleeve 604 coupled thereto. In other embodiments, the sleeve 604 may be a collar or other upset that is integrally-formed with the tubular segment 602. The sleeve 604 may include a circumferential shoulder 606 adapted to engage the elevator 100 at each slip 130a-d (only the second and third slips 130b and 130d are shown in FIG. 6).

The slips 130a-d may engage the tapered surface 608 of the respective slot 128 with a corresponding inclined surface 610. Via this sloping engagement between the tapered surface 608 and the inclined surface 610, the radial movement of the slips 130a-d toward or away from the center of the elevator 100 is realized. Consequently, the collective radial circumference of the slips 130a-d is able to increase and/or decrease over a fixed range, thereby manipulating the radius of the throat 126 and enabling the elevator 100 to receive and properly secure tubular segments 602 having a varied and increased range of an outside diameter $O_d$. As will be appreciated, this may be achieved without requiring any adjustment to or replacement of the elevator 100.

With the elevator 100 in the open position, as shown in FIG. 3, the tubular segment 602 may enter the throat 126. Once the elevator 100 is closed, the tension handles 140a,b (FIGS. 1-3) may be moved into the locked position, as shown in FIG. 5. Moving the tension handles 140a,b into the locked position applies a spring force on the slips 130a-d that results in the axial-downward and radial-inward movement of the slips 130a-d. As illustrated in FIG. 6, the second and third slips 130b,d will move axially-downward and radially-inward until eventually engaging the outside surface 612 of the tubular segment 602. The weight of the tubular segment 602 may shift the tubular segment 602 vertically until the circumferential shoulder 606 engages the slips 130b,d, thereby impeding its further downward progress. Via this sloping engagement between the tapered surface 608 and the inclined surface 610 of each slip 130b,d, any increased force in the downward direction against the slips 130b,d only tightens the engagement with the slips 130b1d on the outside diameter $O_d$ of the tubular segment 602.

Once the tubular segment 602 is properly coupled to a tubular string or otherwise securely captured by another lifting mechanism, the tension handles 140a,b may be unlocked in preparation for receiving a new tubular segment 602. Unlocking the tension handles 140a,b releases the spring forces on the slips 130a-d and allows the slips 130a-d to move axially-upward and into the open position, thereby releasing the tubular segment 602 from engagement with the elevator 100.

Figure 7:
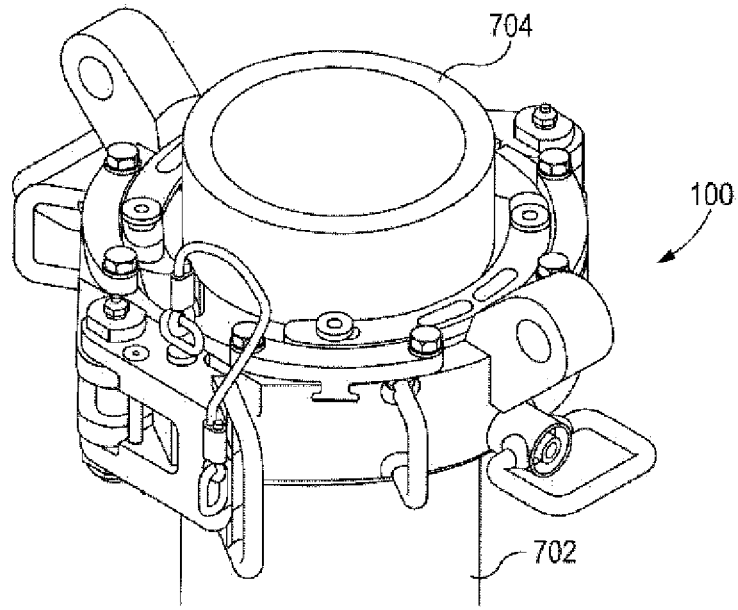
FIG. 7 illustrates an isometric view of an exemplary elevator grasping a tubular segment, according to one or more embodiments of the disclosure.

Referring to FIG. 7, illustrated is an isometric view of the exemplary oilfield elevator 100 engaged with a tubular segment 702, according to one or more embodiments disclosed. As described above, the elevator may be engaged to the tubular segment 702 at a sleeve 704. Those skilled in the art will recognize the several advantages provided by the elevator 100. For example, the elevator 100 is able to securely grasp onto multiple outside diameters within a nominal tubular segment 702 size. As a result, significant savings in money and time may be gained that would otherwise be spent in removing and replacing the elevator 100 or adjusting the settings for different outside diameters.

As used herein, the term "single-joint elevator" is intended to distinguish the elevator from a string elevator that is used to support the weight of the entire pipe string. Rather, a "single joint elevator" is used to grip and lift a tubular segment as is necessary to add or remove the tubular segment to or from a tubular string. Furthermore, a pipe or tubular "segment", as that teem is used herein, is inclusive of either a single pipe or tubular joint or a stand made up of multiple joints of a pipe or other tubular that will be lifted as a unit. In the context of the present disclosure, a tubular segment does not include a tubular string that extends into the well.

Figure 8:
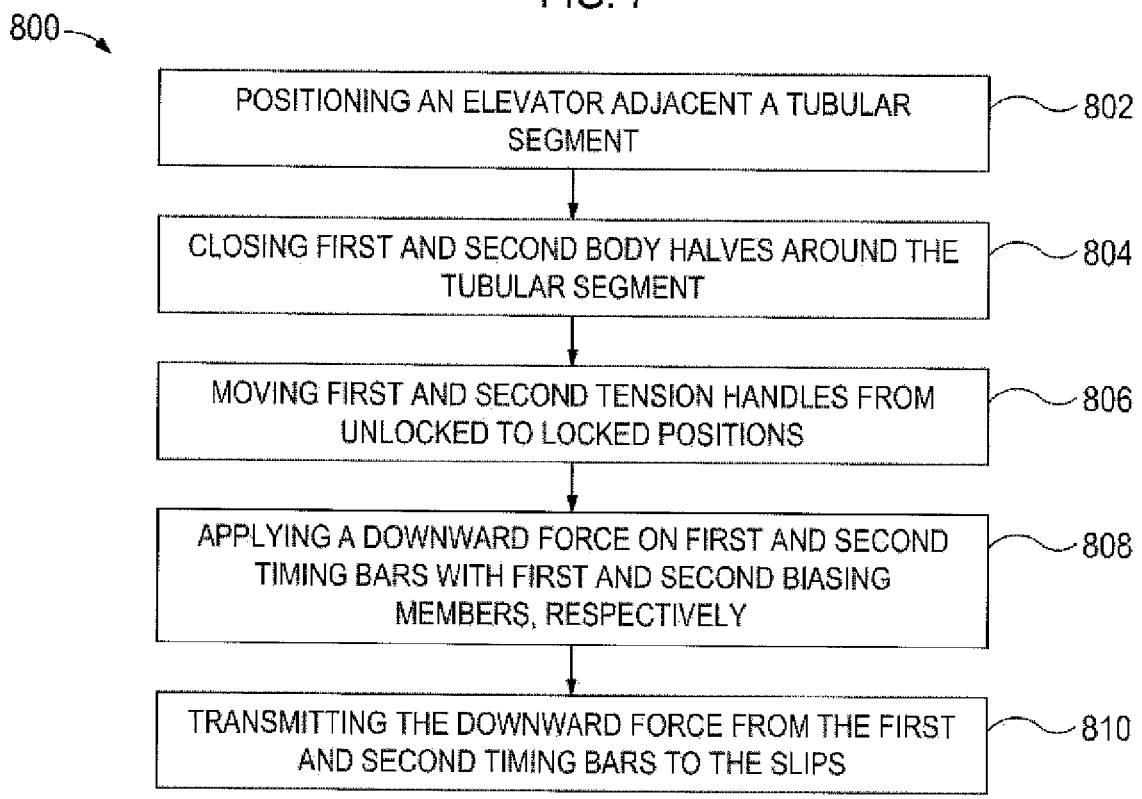
FIG. 8 is a flowchart of a method for engaging a tubular segment, according to one or more embodiments of the disclosure.

Referring now to FIG. 8, illustrated is a method 800 for engaging a tubular segment. In one embodiment, the method 800 may include positioning an elevator adjacent the tubular segment, as at 802. The elevator may include first and second body halves that have slips that are slidably received within corresponding tapered slots. The corresponding tapered slots may be defined in the first and second body halves. Moreover, a first timing bar may be coupled to the slips in the first body half and a second timing bar may be coupled to the slips in the second body half. The method 800 may further include closing the first and second body halves around the tubular segment, as at 804.

First and second tension handles may then be moved from an unlocked position to a locked position, as at 806. In one embodiment, the first and second tension handles may be pivotally-coupled to the first and second body halves, respectively, and each tension handle may have a body that terminates at a connection point. The method 800 may further include applying a downward force on the first and second timing bars with first and second biasing members, as at 808. The first and second biasing members may each have a first end coupled to the connection point of the first and second tension handles, respectively, and a second end coupled to the first and second timing bars, respectively. The downward force may then be transmitted from the first and second timing bars to the slips, as at 810. The slips may be configured to translate vertically within the tapered slots and at the same time translate radially with respect to the first and second body halves in response to the downward force. Accordingly, the slips may translate vertically and radially until coming into contact with an outside surface of the tubular segment.

Figure 9A:
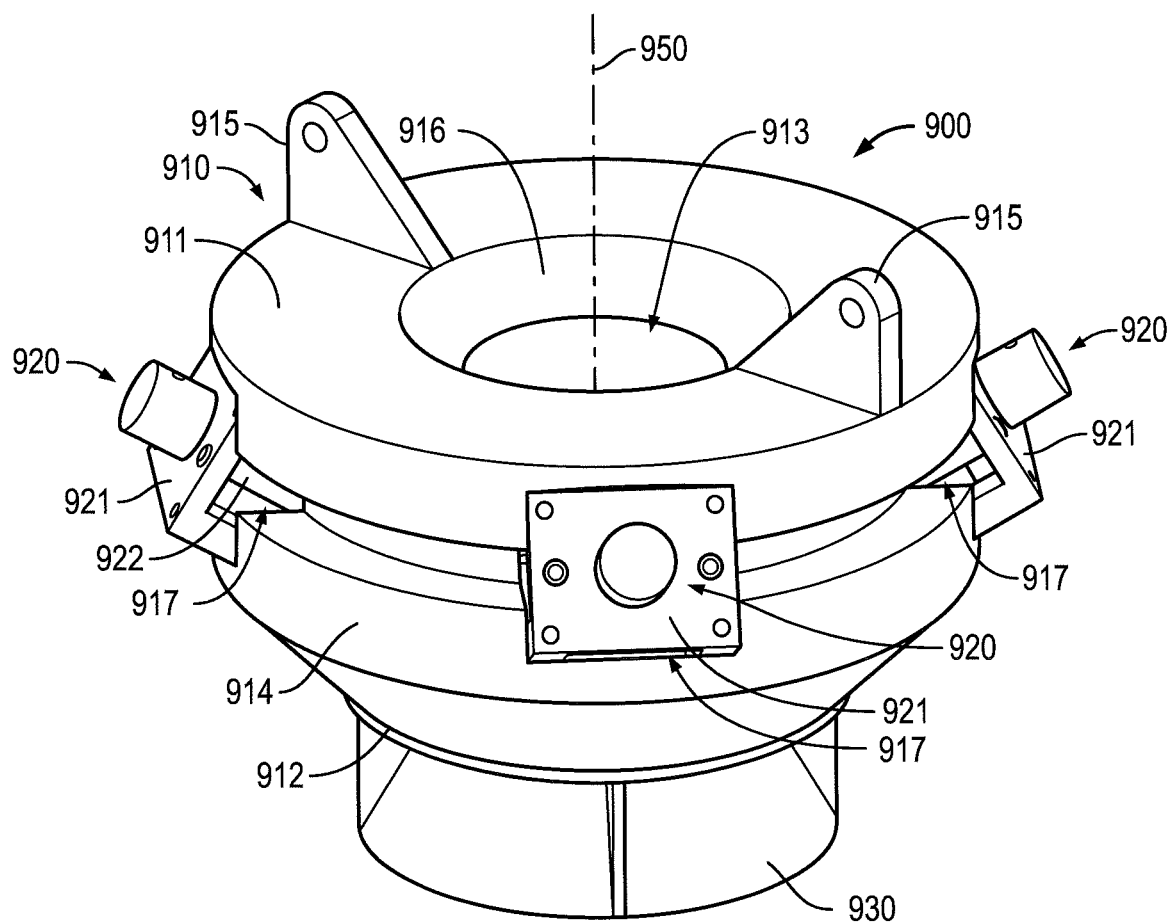
FIGS. 9A and 9B illustrate isometric views of an elevator, according to one or more embodiments of the disclosure.
Figure 9B:
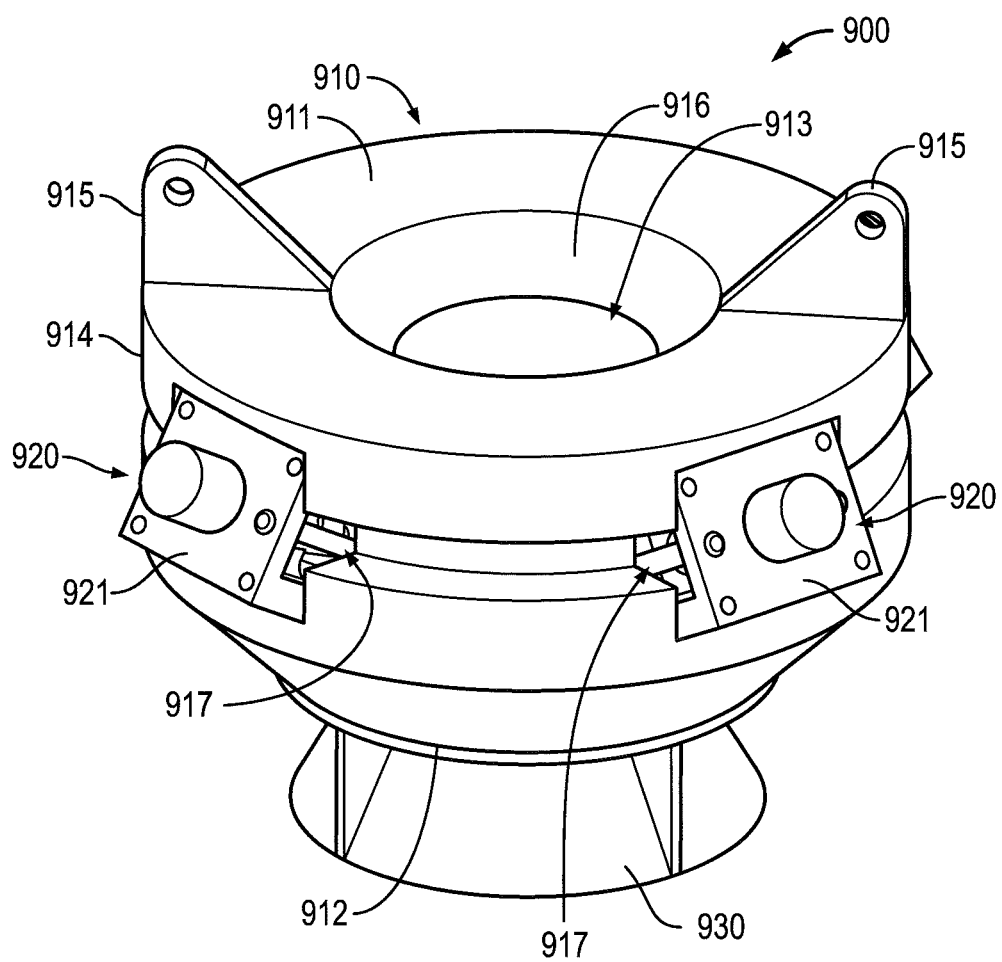

Referring now to FIGS. 9A and 9B, an elevator 900 according to one or more embodiments is shown. In one or more embodiments, the elevator 900 may include an elevator body 910, slip assemblies 920, and a base member 930. The elevator body 910 may have a bore 913 formed therethrough with a longitudinal axis 950 defined therethrough. In one or more embodiments, the bore 913 formed through the elevator body 910 may receive a tubular segment (not shown), and the elevator 900 may be used to secure and lift the tubular segment. In one or more embodiments, the tubular segment may include a tubular segment and may be part of a string of tubular segments. As such, in one or more embodiments, the elevator 900 may be used to secure and lift a string of tubular segments.

Further, in one or more embodiments, the elevator body 910 may have a pair of lifting ears 915 disposed thereon. For example, as shown, the lifting ears 915 may be formed on a top surface 911 of the elevator body 910, and the lifting ears 915 may be configured to bear the entire load of the elevator 900 and the tubular segment (not shown) when lifting the tubular segment. Additionally, in one or more embodiments, the elevator body 910 may have a guide portion 916 formed on the top surface 911 of the elevator body 910. In one or more embodiments, the guide portion 916 may be adjacent to the bore 913 and may direct a tubular segment into the bore 913 of the elevator body 910. In one or more embodiments, the guide portion 916 may include a tapered surface formed on the elevator body 910 configured to direct a tubular segment into the bore 913 of the elevator body 910. In one or more embodiments, the guide portion 916 of the elevator body 910 may be a tapered surface that extends from a top surface 911 of the elevator body 910 toward a center of the elevator body 910, e.g., toward the slip assemblies 920, such that a diameter of the bore 913 decreases from the top surface 911 of the elevator body 910 to the center of the elevator body 910.

Still referring to FIGS. 9A and 9B, in one or more embodiments, the elevator body 910 may have a plurality of openings 917 formed therein, in which each of the openings 917 may be configured to receive a slip assembly, e.g., a slip assembly 920. In one or more embodiments, the plurality of openings 917 may be formed through the elevator body 910, e.g., from an outer surface 914 of the elevator body 910 to the bore 913 of the elevator body 910.

In one or more embodiments, each of the slip assemblies 920 of the elevator 900 may include an actuator body 921, a powered actuator 922, a biasing member (not shown), and slips (not shown). In one or more embodiments, the slip assemblies 920 may be disposed within the openings 917 of the elevator body 910. Further, in one or more embodiments, the actuator body 921 of each of the slip assemblies 920 may be coupled to the elevator body 910 to maintain the slip assemblies 920 within the openings 917 of the elevator body 910. Furthermore, in one or more embodiments, the powered actuator 922 of each of the slip assemblies 920 may be coupled to the actuator body 921. In one or more embodiments, the powered actuator 922 of each of the slip assemblies 920 may include a hydraulic cylinder and may be connected to the actuator body 921. For example, in one or more embodiments, the powered actuator 922 of each of the slip assemblies 920 may include a hydraulic cylinder connected to the actuator body 921 by a pin (not shown). However, other powered actuators known in the art may be used. Further, other means of coupling known in the art may be used to connect the powered actuator 922 to the actuator body 921.

Further, in one or more embodiments, the base member 930 may be coupled to a bottom surface 912 of the elevator body 910, and the base member 930 may have a bore (not shown) formed therethrough and a guide portion (not shown) formed thereon. In one or more embodiments, the bore of the base member 930 may be substantially aligned with the bore 913 of the elevator body 910. Further, in one or more embodiments, the guide portion of the base member 930 may be configured to direct the tubular segment (not shown) into the bore 913 of the elevator body 910. For example, the guide portion of the base member 930 may include a tapered surface formed on the base member 930 configured to direct a tubular segment into the bore of the base member 930. In one or more embodiments, the guide portion of the base member 930 may taper in a direction that is substantially opposite to a direction the guide portion 916 of the elevator body 910 tapers.

Figure 10:
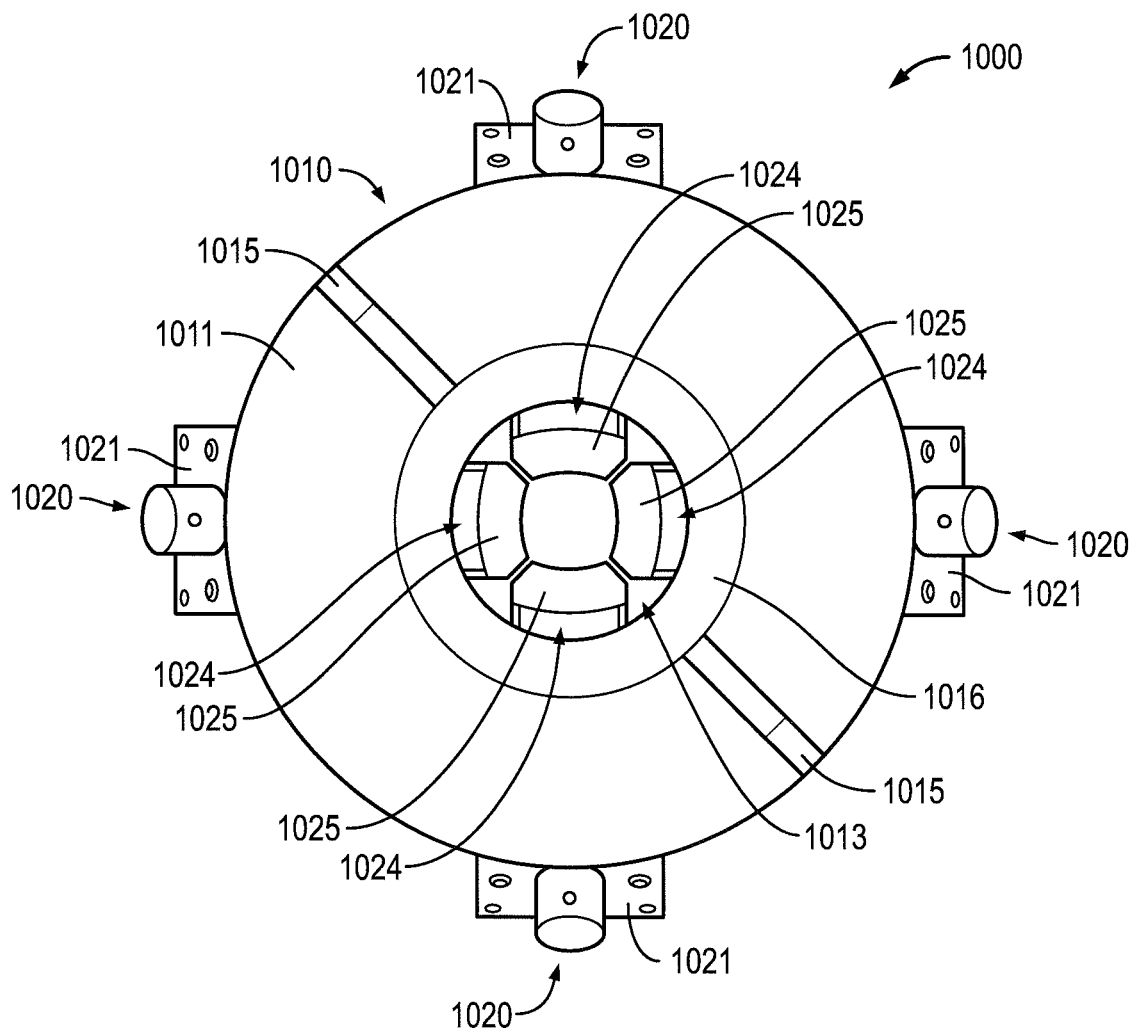
FIG. 10 illustrates a top view of an elevator, according to one or more embodiments of the disclosure.

Referring to FIG. 10, a top view of an elevator 1000 having slips 1024 in a closed position are shown in accordance with embodiments disclosed herein. In one or more embodiments, the elevator 1000 may include at least an elevator body 1010 having a bore 1013 formed therethrough and slip assemblies 1020 coupled thereto. Further, in one or more embodiments, the elevator body 1010 may have a pair of lifting ears 1015 disposed on a top surface 1011 of the elevator body 1010 that may be configured to bear the entire load of the elevator 1000 and the tubular segment (not shown) when lifting the tubular segment. Furthermore, in one or more embodiments, the elevator body 1010 may have a guide portion 1016 formed on the top surface 1011. In one or more embodiments, the guide portion 1016 may include a tapered surface, and the guide portion 1016 may be adjacent to the bore 1013 and may direct a tubular segment into the bore 1013 of the elevator body 1010.

Further, in one or more embodiments, the elevator body 1010 may have openings (not shown) in which the slip assemblies 1020 may be disposed and coupled. In one or more embodiments, each of the slip assemblies 1020 may include an actuator body 1021, a powered actuator (not shown), the slip 1024, and a biasing member (not shown). As discussed above, in one or more embodiments, the actuator body 1021 may be coupled to the elevator body 1010 such that the slip assemblies 1020 are maintained within openings (not shown) of the elevator body 1010. Further, in one or more embodiments, the powered actuator may be coupled to the actuator body 1021. Moreover, in one or more embodiments, the powered actuator may also be coupled to the slip 1024 such that the slips may be retracted from the bore 1013 of the elevator body 1010, e.g. in a direction away from the longitudinal axis 950 shown in FIG. 9A. In addition, in one or more embodiments, the biasing member may be coupled to the slip 1024 such that the slip 1024 is biased toward the center of the bore 1013, which is a closed position. In other words, in one or more embodiments, the biasing member may be coupled to the slip 1024 such that the slip 1024 is biased in a direction toward the longitudinal axis 950 shown in FIG. 9A. Alternatively, one or more embodiments may not include a biasing member. In one or more embodiments, the weight of the slip acting on an inclined surface of the opening 1017, in which the slip 1024 is disposed, 1024 may cause the slip 1024 to be biased toward a closed position without the use of a biasing member. As such, in one or more embodiments, the plurality of slips 1024 may be configured to automatically set, e.g., engage with a tubular segment, by way of the biasing member or without the use of the biasing member. In one or more embodiments, the slips 1024 may contact adjacent slips 1024.

In one or more embodiments, each slip 1024 may include an engagement surface 1025 and a guide surface (not shown). In one or more embodiments, the engagement surface 1025 may be cut on each of the slips 1024 such that the engagement surface 1025 is orthogonal to an axis, e.g., axis 950 as shown in FIG. 9A, formed by the bore 1013. In one or more embodiments, the engagement surface 1025 may be configured to engage a portion of a tubular segment, e.g., a shoulder of a segment of shouldered pipe. The slips 1024 according to one or more embodiments will be discussed in greater detail below.

Figure 11A:
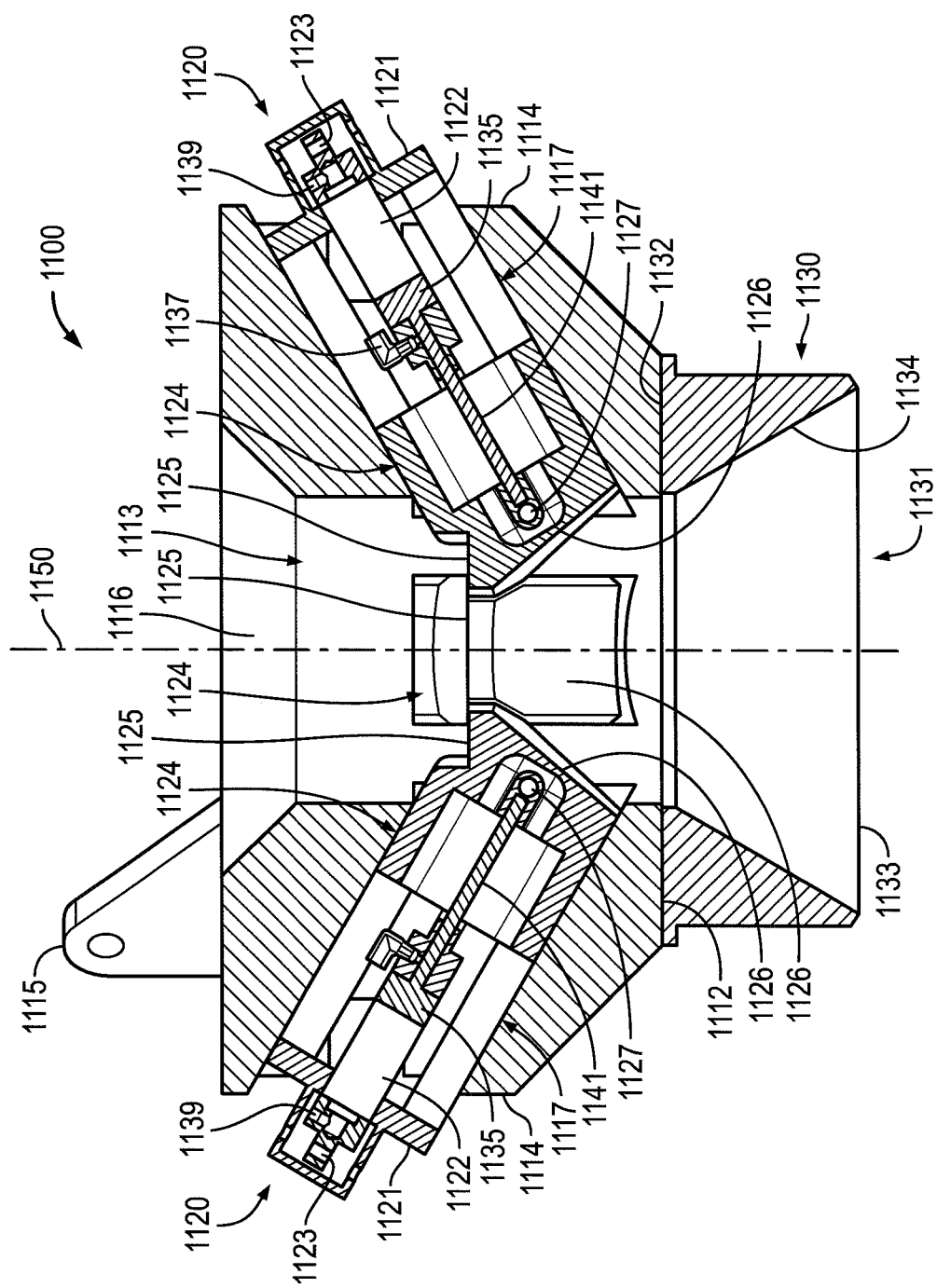

Referring to FIGS. 11A and 11B, cross-sectional views of an elevator 1100 according to one or more embodiments are shown. As shown, in one or more embodiments, the elevator 1100 may include an elevator body 1110, slip assemblies 1120, and a base member 1130.

As discussed above, the elevator body 1110 may have a bore 1113 formed therethrough and a longitudinal axis 1150 defined therethrough. In addition, in one or more embodiments, the elevator body 1110 may include a pair of lifting ears 1115 (only one shown in FIG. 11) formed on a top surface 1111 of the elevator body 1110. Further, the elevator body may have a guide portion 1116 formed on the top surface 1111 of the elevator body 1110 adjacent to the bore 1113 that directs a tubular segment (not shown) into the bore 1113 of the elevator body 1110. In one or more embodiments, the guide portion 1116 may include a tapered surface formed on the elevator body 1110 configured to direct a tubular segment into the bore 1113 of the elevator body 1110.

Furthermore, in one or more embodiments, the elevator body 1110 may include openings 1117 formed therein. In one or more embodiments, the openings 1117 may be configured to receive the slip assemblies 1120. In one or more embodiments, the openings 1117 formed in the elevator body 1110 may extend from an outer surface 1114 of the elevator body 1110 to the bore 1113. In one or more embodiments, a cross-section of the openings may be configured to fit an outer profile of the slip assemblies 1120. For example, in one or more embodiments, a cross-section of the openings 1117 may be relatively square in shape, and the openings 1117 may start near the top surface 1111 on the outer surface 1114 and finish near a bottom surface 1112 in the bore 1113 of the elevator body 1110.

In one or more embodiments, the slip assemblies 1120A and 1120B may be disposed within the openings 1117 and may be coupled to the elevator body 1110. As discussed above, each of the slip assemblies 1120A and 1120B may include an actuator body 1121, a powered actuator 1122, and a slip 1124. As discussed above, in one or more embodiments, each actuator body 1121 may be coupled to the elevator body 1110 such that the slip assemblies 1120 may be maintained within the openings 1117. Further, in one or more embodiments, each powered actuator 1122 may be coupled to the actuator body 1121 such that the powered actuator 1122 may be maintained within the opening 1117 and such that the powered actuator 1122 extends toward the bore 1113 of the elevator body 1110. In one or more embodiments, a pin 1123 may be used to couple the powered actuator 1122 to the actuator body 1121. However, other means of coupling known in the art may be used to connect the powered actuator 1122 to the actuator body 1121.

Furthermore, referring to FIGS. 11A and 11B, in one or more embodiments, the powered actuator 1122 may be coupled to the slip 1124 such that the slip 1124 may move within the opening 1117 of the elevator body 1110 between a closed position and an open position. In one or more embodiments, the closed position may be one in which the slips 1124 are extended from the opening 1117 within the bore 1113 of the elevator body 1110 until the powered actuator 1122 is fully stroked. In one or more embodiments, the open position may be one in which the slips 1124 are retracted from the bore 1113 of the elevator body 1110 into the openings 1117 such that the slips 1124 may not retain a tubular segment (not shown). However, in one or more embodiments, the closed position may be a position in which the slips 1124 are extended from the opening 117 within the bore 1113 and contact a portion of a tubular segment. As such, the closed position of the slips 1124 according to embodiments disclosed herein is not necessarily limited to a position of the slips 1124 in which the power actuator 1122 is fully stroked. In one or more embodiments, a pin 1127 may be used to couple the slip 1124 to the powered actuator 1122. However, other means of coupling known in the art may be used to connect the powered actuator 1122 to the actuator body 1121.

In one or more embodiments, powered actuator 1122 may include a hydraulic cylinder, in which hydraulic fluid may be introduced into/withdrawn on opposite sides of a hydraulic piston 1135 through one or more hydraulic ports 1137 and 1139. For example, in one or more embodiments, hydraulic fluid may be introduced into the powered actuator 1122 through an "opening" port 1137 in order to withdraw the slip 1124 (connected to piston 1135 through rod 1141) away from bore 1150 and into one or more positions between fully open and fully closed. Similarly, hydraulic fluid may be introduced into the powered actuator 1122 through an "closing" port 1139 in order to extend the slip 1124 toward bore 1150 and into one or more positions between fully open and fully closed. As would be understood by those having ordinary skill, introducing fluid into opening port 1137 may require removal of fluid from closing port 1139 and vice versa. In alternative embodiments, a biasing member (e.g., a spring) may bias piston 1135 toward either a fully open or a fully closed position, such that loss of hydraulic power to either or both ports 1137 and 1139 may allow piston 1135 (and slip 1124 connected to piston 1135 through rod 1141) to move in a default or "failsafe" direction. Alternatively, the weight of the slip 1124 itself may bias the piston 1135 and slip 1124 assembly into a desired failsafe direction within opening 1117 absent additional biasing members.

For example, as shown in FIG. 11B, the slip assembly 1120A includes a biasing member 1128. In one or more embodiments, the biasing member 1128 may be disposed within the powered actuator 1122. In one or more embodiments, the biasing member 1128 may be disposed outside of the powered actuator but within the slip assembly 1120A such that a portion of the biasing member 1128 is engaged with the actuator body 1121 and another portion of the biasing member 1128 is engaged with the slip 1124. In one or more embodiments, the biasing member 1128 may be a coil spring and may be configured to bias the slip 1124 in a direction toward the bore 1113, e.g., toward a closed position. Alternatively, in one or more embodiments, the biasing member 1128 may be configured to bias the slip 1124 in a direction away from the bore 1113, e.g., toward a fully open position.

Additionally, referring to FIGS. 11A and 11B, in one or more embodiments, each of the slips 1124 may include an engagement surface 1125 and a guide surface 1126. In one or more embodiments, the engagement surface 1125 may be disposed on an upper surface of the slip 1124. In one or more embodiments, the engagement surface 1125 of the slips 1124 may be configured to engage a portion of a tubular segment (not shown) and may be configured to hold the tubular segment by a shoulder (not shown) of the tubular segment. In one or more embodiments, the engagement surface 1125 may extend in a direction that is orthogonal to the longitudinal axis 1150 of the bore 1113 of the elevator body 1110. As such, the engagement surface 1125 of the slips 1124 may be configured to engage a shoulder of a shouldered tubular segment, which may allow the shoulder of a shouldered tubular segment to be supported by the slips 1124.

Further, in one or more embodiments, the guide surface 1126 may be a tapered surface formed on a bottom surface of the slip 1124. The guide surface 1126 may be disposed such that a tubular segment (not shown) that is inserted into the elevator 1100 may exert a force on the slip assemblies 1120 in order to overcome the biasing force imposed on the slips 1124 and to separate the slips 1124 to allow the tubular segment to pass through the bore 1113 of the elevator body 1110. In other words, the guide surface 1126 of each of the slips 1124 may be configured to guide a tubular segment within the elevator 1100 and may allow the tubular segment to be secured and supported within the elevator 1100.

Still referring to FIGS. 11A and 11B, in one or more embodiments, a top surface 1132 of the base member 1130 may be connected to the bottom surface 1112 of the elevator body 1110 such that the base member 1130 may direct a tubular segment (not shown) into the bore 1113 of the elevator body 1110. In one or more embodiments, the base member 1130 may have a bore 1131 formed therethrough. Further, in one or more embodiments, the base member 1130 may include a guide portion 1134 that may be configured to direct a tubular segment into the bore 1113 of the elevator body 1110. In one or more embodiments, the guide portion 1134 of the base member 1130 may be a tapered surface that extends from a bottom surface 1133 of the base member 1130 to the top surface 1132 of the base member 1130 such that a diameter of the bore 1131 decreases from the bottom surface 1133 to the top surface 1132.

One or more aspects of the present invention are directed to a method to manufacture an elevator that engages a tubular segment. In one or more embodiments, the method to manufacture may include forming a bore in an elevator body of the elevator, forming a plurality of openings in the elevator housing that extend from an outer surface of the elevator body to the bore of the elevator body, and assembling a plurality of slip assemblies. In one or more embodiments, assembling each of the plurality of slip assemblies may include coupling a powered actuator to an actuator body, and coupling the powered actuator to the slip, in which the powered actuator is configured to retract the slip from the biased position and toward the actuator body. In one or more embodiments, the method to manufacture may also include disposing the plurality of slip assemblies inside the plurality of openings of the elevator body, and coupling the plurality of slip assemblies to the elevator body, in which the plurality of slip assemblies are configured to automatically engage the tubular segment.

In one or more embodiments, assembling the plurality of slip assemblies may also include coupling a biasing member to a slip such that the slip is biased away from the actuator body toward a biased position. Further, in one or more embodiments, the method to manufacture may also include coupling a base member to a bottom surface of the elevator body, in which the base member is configured to direct the tubular segment into the bore of the elevator body.

In one or more embodiments, a tubular segment having at least two distinct outer diameters such that a shoulder exists may be raised to stand vertically and may be added to a string of pipes. In one or more embodiments, an elevator, as described above, may be lowered over an end of the tubular segment that is standing vertically. While the elevator is lowered over the end of the tubular segment, a base member of the elevator, e.g., a guide portion of the base member, may direct the tubular segment into a bore of an elevator body of the elevator.

Further, in one or more embodiments, slips that are biased toward a center of the bore of the elevator body may be separated away from each other by the tubular segment, which may allow the tubular segment to pass through the bore of the elevator body. For example, referring back to FIG. 10, the slips 1024 may be biased toward a center of the bore 1013 of the elevator body 1010. In one or more embodiments, a tubular segment (not shown) may be disposed in the bore 1013, which may engage the slips 1024, e.g., engage with the guide surface of 1126 shown in FIG. 11A, which may cause the slips 1024 to be separated away from each other. Furthermore, in one or more embodiments, the biasing force imposed on the slips, e.g., by way of a biasing member or by way of the weight of each of the slips disposed on an inclined surface of the openings 1117, may cause the slips to collapse around the smaller diameter of the outer diameters of the tubular segment. As such, in one or more embodiments, the slips may collapse around the smaller diameter of the outer diameters of the tubular segment such that the shoulder on the tubular segment may rest on and be held by an engagement surface of the slips.

In one or more embodiments, the tubular segment grasped by the elevator may be lifted by lifting ears, e.g., the lifting ears 915 shown in FIG. 9A, on a top surface of the elevator body and may be positioned above a string of tubular segments. Further, in one or more embodiments, the elevator may engage the tubular segment with the string of tubular segments and may rotate such that the tubular segment is threaded to the string of tubular segments. Once the tubular segment is connected to the string of tubular segments, powered actuators may retract the slips away from the tubular segment, and the elevator may be raised off of the string of tubular segments.

As such, one or more aspects of the present invention are directed to a method to add a tubular segment to a drilling string of pipe. In one or more embodiments, the method for adding a tubular segment to a drilling string of pipe may include rotating the tubular segment up from a non-vertical position to a substantially vertical position and grasping the tubular segment in the vertical position with an elevator. In one or more embodiments, grasping the tubular segment in the vertical position with an elevator may include lowering the elevator over an upper end of the tubular segment, separating a plurality of slips from a closed position to an open position by the upper end of the tubular segment, in which the plurality of slips are biased toward the closed position, and automatically enclosing the plurality of slips about an outer diameter of the tubular segment, e.g., by way of a biasing member or by way of the weight of each of the slips acting on an inclined surface of the opening in which the slips is disposed, in which a shoulder on the upper end of the tubular segment rests on upper surfaces of the plurality of slips. In one or more embodiments, the method may also include lifting the tubular segment with the elevator, positioning the tubular segment over the drilling string of pipe, threading the tubular segment onto the drilling string of pipe by rotating the tubular segment using the elevator, and releasing the tubular segment from the elevator by retracting the slips from the outer diameter of the tubular segment.

In one or more embodiments, each of the plurality of slips are retracted by a powered actuator. Further, in one or more embodiments, lifting the tubular segment with the elevator may include lifting the elevator by a pair of lifting ears disposed on the elevator, in which the pair of lifting ears are configured to bear a load of the tubular segment. In one or more embodiments, the plurality of slips may not be engaged with the tubular segment in the open position. In one or more embodiments, the plurality of slips may be engaged with the tubular segment in the closed position. In one or more embodiments, an engagement surface of the plurality of slips may be engaged with the tubular segment in the closed position.

Furthermore, in one or more embodiments, grasping the tubular segment in the vertical position with the elevator further may include guiding the tubular segment along a guide surface of the plurality of slips. Moreover, in one or more embodiments, grasping the tubular segment in the vertical position with the elevator further may include guiding the tubular segment along a guide portion of a base member of the elevator.

Figure 12A:
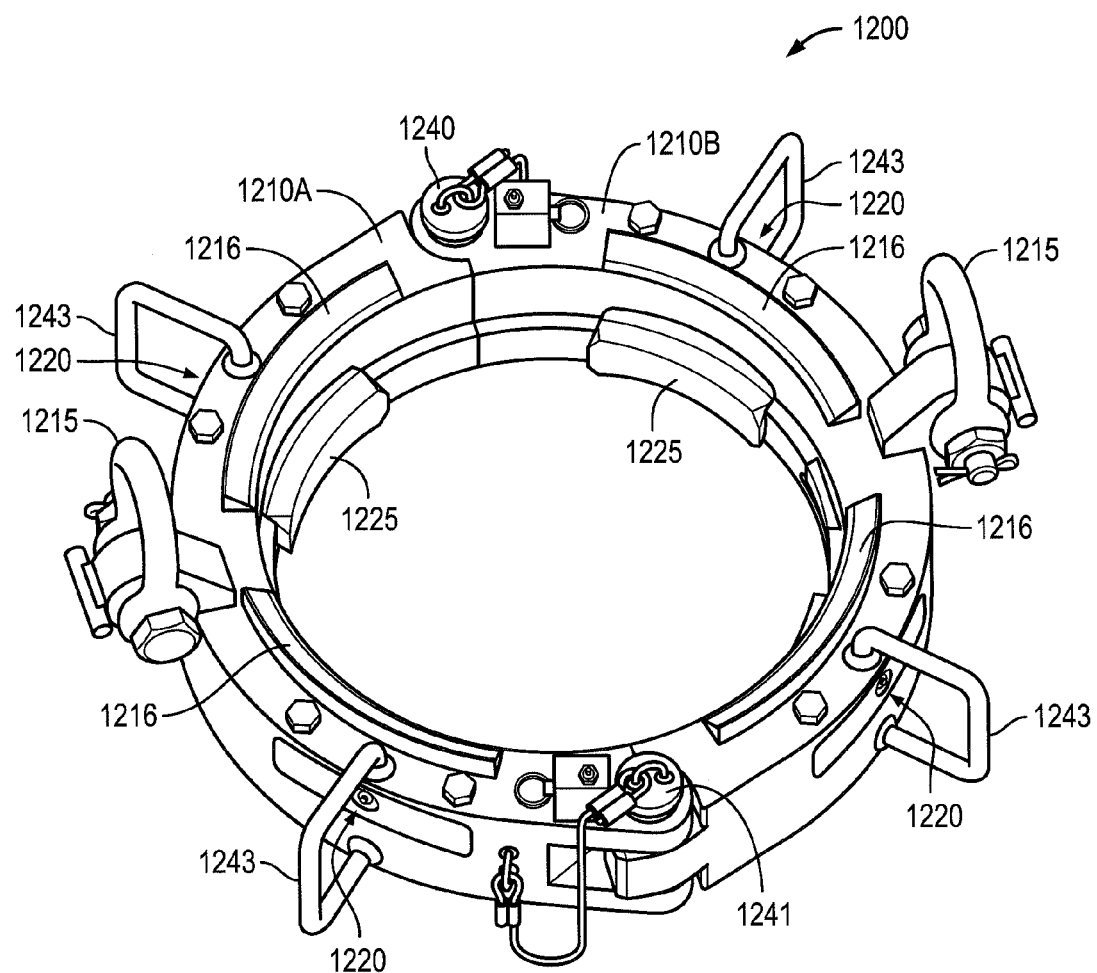
FIG. 12A illustrates an isometric view of an elevator, according to one or more embodiments of the disclosure.
Figure 12B:
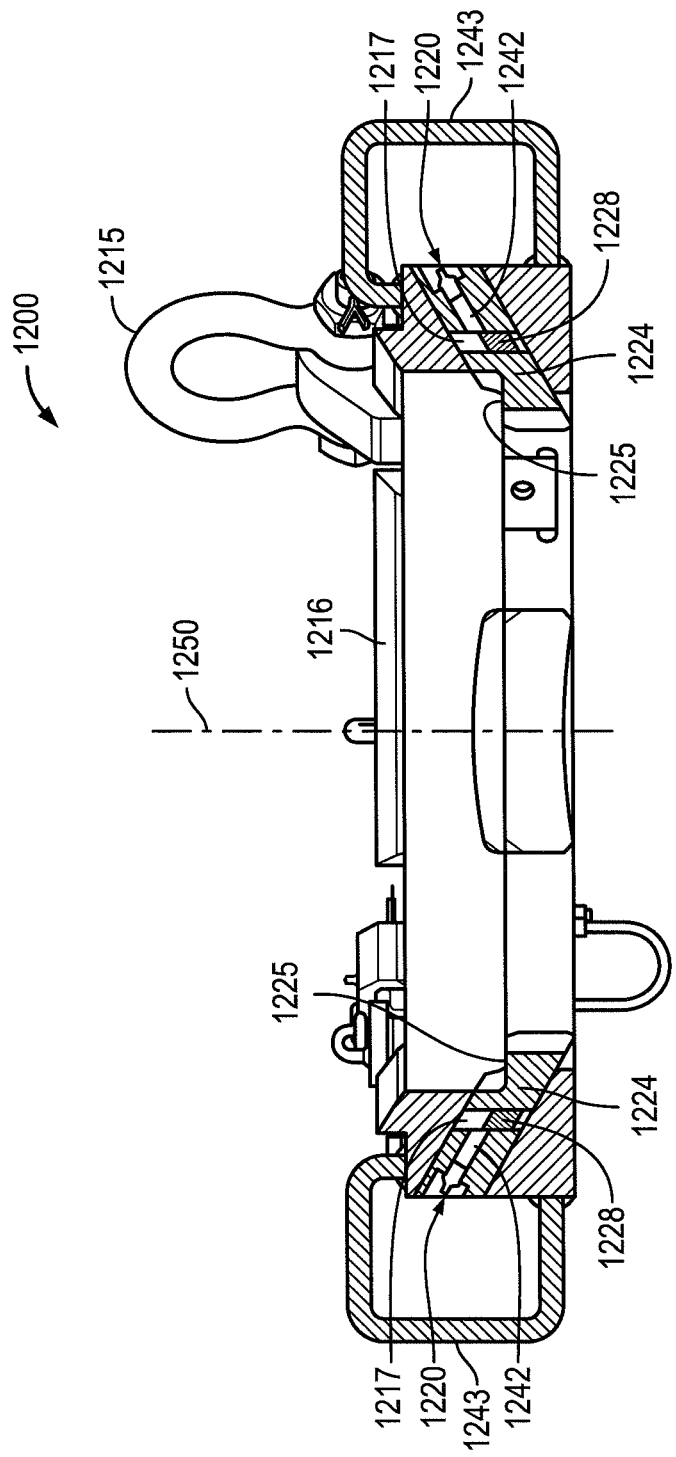
FIG. 12B illustrates a cross-sectional view of the elevator shown in FIG. 12A.

Referring now to FIGS. 12A and 12B, multiple views of an elevator 1200 according to embodiments disclosed herein are shown. As shown, the elevator 1200 may include an elevator body including a first elevator segment 1210A and a second elevator segment 1210B. In one or more embodiments, the first elevator segment 1210A may be coupled to the second elevator segment 1210B by way of a first pin 1240 and a second pin 1241. In one or more embodiments, the first pin 1240 and the second pin 1241 may connect the first elevator segment 1210A to the second elevator segment 1210B. As such, in one or more embodiments, each of the first elevator segment 1210A and the second elevator segment 1210B may each include bores formed therethrough, in which the bores formed through the first elevator segment 1210A and the second elevator segment 1210B are configured to receive the first pin 1240 and the second pin 1241.

In one or more embodiments, each of the first pin 1240 and the second pin 1241 may be removable, which may allow the first elevator segment 1210A and the second elevator segment 1210B to be separated from each other. For example, in one or more embodiments, the first pin 1240 may be removed from engagement with the first elevator segment 1210A and the second elevator segment 1210B, which may result in the first elevator segment 1210A being able to pivot relative the second elevator segment 1210B about the second pin 1241. As such, in one or more embodiments, the first pin 1240 may be removed from engagement with the first elevator segment 1210A and the second elevator segment 1210B, which may allow the first elevator segment 1210A and the second elevator segment 1210B to pivot about the second pin 1241 and receive a tubular segment (not shown) by separating the first elevator segment 1210A from the second elevator segment 1210B, and then closing the first elevator segment 1210A and the second elevator segment 1210B around the tubular segment, and then re-inserting the first pin 1240. In one or more embodiments, each of the first pin 1240 and the second pin 1241 may be attached to the first elevator segment 1210A and/or the second elevator segment 1210B, e.g., by way of a cord or tether.

In one or more embodiments, the elevator 1200 may include handles 1243 disposed on each of the first elevator segment 1210A and the second elevator segment 1210B. In one or more embodiments, the handles 1243 may provide a gripping surface for an operator and may assist the operator in pivoting each of the first elevator segment 1210A and the second elevator segment 1210B about a pivot point, e.g., about the first pin 1240 and/or about the second pin 1241. As such, the handles 1243 may assist an operator in opening and closing the elevator 1200 around a tubular segment by removing the first pin 1240, pulling/pushing the handle 1243 of one of the first elevator segment 1210A and the second elevator segment 1210B to pivot one of the first elevator segment 1210A and the second elevator segment 1210B about a pivot point, and then pushing/pulling the handle 1243 to close one of the first elevator segment 1210A and the second elevator segment 1210B around a tubular segment.

Further, in one or more embodiments, the elevator 1200 may have a pair of lifting ears 1215 disposed thereon. For example, as shown, the lifting ears 1215 may be formed on a top surface of each of the first elevator segment 1210A and the second elevator segment 1210B, and the lifting ears 1215 may be configured to bear the entire load of the elevator 1200 and the tubular segment (not shown) when lifting the tubular segment.

Additionally, in one or more embodiments, the elevator body 1210 may have a guide portion 1216 formed on the top surface of each of the first elevator segment 1210A and the second elevator segment 1210B. In one or more embodiments, the guide portion 1216 may be adjacent to a bore 1213 formed between the first elevator segment 1210A and the second elevator segment 1210B and may direct a tubular segment into the bore 1213 of the elevator 1200. In one or more embodiments, the guide portion 1216 may include a tapered surface formed on each of the first elevator segment 1210A and the second elevator segment 1210B configured to direct a tubular segment into the bore 1213 of the elevator 1200.

Furthermore, in one or more embodiments, the elevator 1200 may include a plurality of slip assemblies 1220. In one or more embodiments, the slip assemblies 1220 may include a slip 1224 disposed within an opening 1217. In one or more embodiments, the opening 1217 may include an inclined surface, and the weight of the slip 1224 may cause the slip 1224 to be biased toward a closed position, e.g., in a direction toward a longitudinal axis 1250 defined through the elevator 1200. Further, in one or more embodiments, each of the openings 1217 may include a port 1242 formed therein, in which lubricant may be introduced into the openings 1217 through the port 1242. Introducing lubricant into the openings 1217 may preserve the ability of the slips 1224 to be biased toward the closed position by minimizing the coefficient of friction between the slips 1124 and the openings 1217. In one or more embodiments, the ports 1242 may be sealed, e.g., by way of a cap or plug, such that materials are selectively introduced into the openings 1217.

Optionally, in one or more embodiments, one or more of the slip assemblies 1220 may also include a biasing member 1228. In one or more embodiments, the biasing member 1228 may be a spring that may engage a portion of the opening 1217 and a portion of the slip 1224 such that the slip 1224 is biased toward the closed position. The biasing member 1228 may reinforce the movement of the slip 1224 induced by the weight of the slip 1224 acting on the inclined surface of the openings 1217 and may further ensure that the slips 1224 may automatically be biased toward the closed position.

In one or more embodiments, the slip 1224 may include an engagement surface 1225 configured to engage with a portion of a tubular segment (not shown). In one or more embodiments, the engagement surface 1225 may be cut on each of the slips 1224 such that the engagement surface 1225 is orthogonal to the longitudinal axis 1250 of the elevator 1200. In one or more embodiments, the engagement surface 1225 may be configured to engage a portion of a tubular segment, e.g., a shoulder of a segment of shouldered pipe.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An elevator to manipulate a tubular segment, the elevator comprising:
    an elevator body with a bore formed therethrough having an axis therein, the elevator body comprising:
        a plurality of openings extending from an outer surface of the elevator body to the bore of the elevator body;
    a plurality of slip assemblies disposed inside the plurality of openings and coupled to the elevator body, each of the plurality of slip assemblies comprising:
        an actuator body coupled to the elevator body;
        a slip, the slip comprising:
            an engagement surface disposed orthogonal to the axis of the bore of the elevator body that engages the tubular segment; and
            a guide surface adjacent to a bottom surface of the elevator body that is angled such that the tubular segment slides through the bore of the elevator body until the tubular segment is engaged by the engagement surface;
        a powered actuator coupled to the slip and the actuator body, wherein the powered actuator is configured to retract the slip from the center of the bore of the elevator body; and
    a base member coupled to a bottom surface of the elevator body, the base member having a guide portion that directs the tubular segment into the bore of the elevator body.

2. The elevator of claim 1, each of the plurality of slip assemblies further comprising a biasing member coupled to the slip, wherein the biasing member biases the slip toward a center of the bore of the elevator body.

3. The elevator of claim 2, wherein the biasing member is a spring coupled to the slip.

4. The elevator of claim 1, wherein the powered actuator is coupled to the slip by a pin, and wherein the powered actuator is coupled to the actuator body by a pin.

5. The elevator of claim 1, wherein the powered actuator is a hydraulic cylinder.

6. The elevator of claim 1, the elevator body further comprising a pair of lifting ears disposed on a top surface of the elevator body.

7. The elevator of claim 6, wherein the pair of lifting ears are configured to bear a load of the tubular segment.

8. The elevator of claim 1, the elevator body further comprising a guide portion formed on the top surface of the elevator body adjacent to the bore of the elevator body.

9. The elevator of claim 1, wherein the guide portion comprises a tapered surface configured to direct the tubular segment into the bore of the elevator body.

10. A method to manufacture an elevator that engages a tubular segment, the method comprising:
    forming a bore in an elevator body of the elevator; and
    forming a plurality of openings in the elevator housing that extend from an outer surface of the elevator body to the bore of the elevator body;
    assembling a plurality of slip assemblies, wherein assembling each of the plurality of slip assemblies comprises:
        forming an engagement surface that is disposed orthogonal to an axis of the bore of the elevator body configured to engage the tubular segment;
        forming a guide surface adjacent to a bottom surface of the elevator body that is angled and configured to allow the tubular segment to slide through the bore of the elevator body until the tubular segment is engaged by the engagement surface;
        coupling a powered actuator to an actuator body; and
        coupling the powered actuator to the slip, wherein the powered actuator is configured to retract the slip from the biased position and toward the actuator body;
    disposing the plurality of slip assemblies inside the plurality of openings of the elevator body; and coupling the plurality of slip assemblies to the elevator body, wherein the plurality of slip assemblies are configured to automatically engage the tubular segment.

11. The method of claim 10, wherein assembling the plurality of slip assemblies further comprises coupling a biasing member to a slip such that the slip is biased away from the actuator body toward a biased position.

12. The method of claim 10, further comprising coupling a base member to a bottom surface of the elevator body, wherein the base member is configured to direct the tubular segment into the bore of the elevator body.

13. A method to add a tubular segment to a drilling string of pipe, the method comprising:
- rotating the tubular segment up from a non-vertical position to a substantially vertical position;
- grasping the tubular segment in the vertical position with an elevator, wherein grasping the tubular segment comprises:
  - lowering the elevator over an upper end of the tubular segment;
  - separating a plurality of slips from a closed position to an open position by the upper end of the tubular segment, wherein the plurality of slips are biased toward the closed position;
  - guiding the tubular segment into a bore formed through a body of the elevator with a guide surface adjacent to a bottom surface of the elevator body, the guide surface being angled such that the tubular segment slides through the bore of the elevator body; and
  - automatically enclosing the plurality of slips about an outer diameter of the tubular segment, wherein a shoulder on the upper end of the tubular segment rests on upper surfaces of the plurality of slips;
- lifting the tubular segment with the elevator;
- positioning the tubular segment over the drilling string of pipe;
- threading the tubular segment onto the drilling string of pipe by rotating the tubular segment using the elevator; and
- releasing the tubular segment from the elevator by retracting the slips from the outer diameter of the tubular segment.

14. The method of claim 13, wherein each of the plurality of slips are retracted by a powered actuator.

15. The method of claim 13, wherein lifting the tubular segment with the elevator comprises lifting the elevator by a pair of lifting ears disposed on the elevator, wherein the pair of lifting ears are configured to bear a load of the tubular segment.

16. The method of claim 13, wherein, in the open position, the plurality of slips are not engaged with the tubular segment.

17. The method of claim 13, wherein, in the closed position, the plurality of slips are engaged with the tubular segment.

18. The method of claim 17, wherein, in the closed position, an engagement surface of the plurality of slips are engaged with the tubular segment.

19. The method of claim 13, wherein grasping the tubular segment in the vertical position with the elevator further comprises guiding the tubular segment along a guide surface of the plurality of slips.

20. The method of claim 13, wherein grasping the tubular segment in the vertical position with the elevator further comprises guiding the tubular segment along a guide portion of a base member of the elevator.

* * * * *